United States Patent
Li et al.

(10) Patent No.: US 9,964,685 B2
(45) Date of Patent: May 8, 2018

(54) ADHESIVE FLUORESCENT FILMS HAVING PRISMATIC LAYER

(71) Applicant: Ningbo Jiangbei Exciton New Material Technology Co., Ltd., Ningbo (CN)

(72) Inventors: Lun Li, Ningbo (CN); Haijiang Tang, Ningbo (CN); Ziying Ma, Ningbo (CN); Gang Li, Ningbo (CN); Yan Zhang, Ningbo (CN)

(73) Assignee: Ningbo Jiangbei Exciton New Material Technology Co., Ltd., Ningbo (CN)

( * ) Notice: Subject to any disclaimer, the term of this patent is extended or adjusted under 35 U.S.C. 154(b) by 286 days.

(21) Appl. No.: 14/937,611

(22) Filed: Nov. 10, 2015

(65) Prior Publication Data
US 2016/0320547 A1    Nov. 3, 2016

(30) Foreign Application Priority Data

Apr. 29, 2015   (CN) .......................... 2015 1 0214365
Jun. 24, 2015   (WO) ................ PCT/CN2015/082143

(51) Int. Cl.
G02B 5/02      (2006.01)
F21V 8/00      (2006.01)
G02B 1/14      (2015.01)
G02B 5/04      (2006.01)

(52) U.S. Cl.
CPC ............. *G02B 6/0051* (2013.01); *G02B 1/14* (2015.01); *G02B 5/045* (2013.01)

(58) Field of Classification Search
CPC ........ F21V 3/0463; F21V 3/0481; F21V 9/16; F21K 6/64; G02B 5/021; G02B 5/0226; G02B 5/0242; G02B 5/206; G02B 6/003; G09F 13/20; G09F 13/42; G09K 11/02
See application file for complete search history.

(56) References Cited

U.S. PATENT DOCUMENTS

| | | | | |
|---|---|---|---|---|
| 5,414,947 A * | 5/1995 | Hjaltason | ................ | G09F 13/04 40/584 |
| 6,658,773 B2 * | 12/2003 | Rohne | ....................... | G09F 3/02 40/542 |
| 7,294,861 B2 * | 11/2007 | Schardt | ................. | H01L 33/507 257/81 |
| 7,784,954 B1 * | 8/2010 | Coleman | ................ | G02B 5/021 362/19 |
| 7,800,726 B2 * | 9/2010 | Kim | ........................ | G02B 1/105 349/112 |
| 7,829,179 B2 * | 11/2010 | Sohn | ................... | C09K 11/7731 250/472.1 |
| 9,080,103 B2 * | 7/2015 | Shirakawa | ............... | C09J 7/026 |

(Continued)

FOREIGN PATENT DOCUMENTS

CN    101225942 A    7/2008
CN    101470299 A    7/2009
(Continued)

*Primary Examiner* — Ismael Negron
(74) *Attorney, Agent, or Firm* — Weisun Rao; Greenberg Traurig, LLP

(57) ABSTRACT

The fluorescent film includes a transparent base layer and an adhesive layer bonded to the one surface of the transparent base layer, and a fluorescent powder uniformly dispersed in an adhesive of the adhesive layer.

10 Claims, 2 Drawing Sheets

(56) References Cited

U.S. PATENT DOCUMENTS

| | | | |
|---|---|---|---|
| 9,122,093 B2* | 9/2015 | Tsukahara | G02B 6/0038 |
| 9,157,026 B2* | 10/2015 | Sohn | C09K 11/7731 |
| 9,577,158 B2* | 2/2017 | Ito | C09K 11/02 |
| 2005/0142371 A1* | 6/2005 | Swain | B32B 25/08 |
| | | | 428/516 |
| 2014/0091346 A1* | 4/2014 | Fujii | H01L 33/505 |
| | | | 257/98 |
| 2015/0301257 A1* | 10/2015 | Choi | C09K 11/025 |
| | | | 362/607 |

FOREIGN PATENT DOCUMENTS

| | | |
|---|---|---|
| CN | 203099434 U | 7/2013 |
| CN | 103647003 A | 3/2014 |
| CN | 103872225 A | 6/2014 |
| CN | 104006354 A | 8/2014 |
| KR | 20130086811 A | 8/2013 |

\* cited by examiner

ADHESIVE FLUORESCENT FILMS HAVING PRISMATIC LAYER

CROSS-REFERENCE TO RELATED APPLICATIONS

This application claims priority to Chinese Application No. 201510214365.9, filed on Apr. 29, 2015, and International application number PCT/CN2015/082143, filed on Jun. 24, 2015, the contents of both of which are incorporated herein by reference in their entireties.

TECHNICAL FIELD OF THE INVENTION

This invention relates to the film display technology, and in particular, to fluorescent films having an adjustable color location and a color gamut.

BACKGROUND OF THE INVENTION

With the continuous development in the display technology, the requirement of the display of a picture is higher and higher. The main trends include a high color gamut, a super big size, and flexible character, etc. Among them, the important target of display technology is a constantly improved color gamut because the display device with a higher color gamut can display the picture more brightly and lively. At present, the OLED or quantum-dot film technology is usually used to improve the color gamut and the color gamut may be over 100%. However, the bottleneck of the OLED and quantum-dot film technology is obvious. For example, the OLED technology is not mature enough and is limited due to its high cost and short working life; and it is very difficult to produce an OLED of a big size. On the other hand, the quantum-dot film is very expensive and the quantum-dot material is not stable enough, which hinders its extensive use.

SUMMARY OF THE INVENTION

In order to overcome the defects of high cost, poor stability, and short working-life of the existing OLED and quantum-dot films, the present invention provides fluorescent films having an adjustable color location and a color gamut. These fluorescent films are useful not only for display technology with backlight, but also for illumination.

In view of the above-mentioned shortcomings of the existing technologies, the present invention provides the following technical solutions:

The present invention provides fluorescent films each having an adjustable color location and a color gamut, wherein each fluorescent film includes a transparent base layer and an adhesive layer; the adhesive layer is bound to a surface of the transparent base layer; the adhesive layer includes an adhesive and fluorescent powder, the fluorescent powder is dispersed in the adhesive.

In some embodiments, the fluorescent powder is uniformly dispersed in the adhesive.

In some embodiments, the material of the transparent base layer is selected from the group consisting of polyethylene terephthalate (PET), polymethyl methacrylate (PMMA), polycarbonate (PC), polyamide (PA), polystyrene(PS), and polyethylene (PE).

In some embodiments, the thickness of the transparent base layer is in the range of 25-250 μm.

In some embodiments, the adhesive is selected from the group consisting of acrylic resin, polyurethane resin, epoxy resin, polystyrene resin, acrylic modified polyurethane resin, acrylic modified silicone resin, and silicone resin. The adhesive forms the adhesive layer after curing. The thickness of the adhesive layer is in the range of 5-75 μm.

In some embodiments, the fluorescent powder is selected from the group consisting of the following compounds: aluminate, silicate, nitride, nitrogen oxide, borate, vanadate, alkaline earth metal sulfide, molybdate, tungstate, borophosphate, chlorine borate, phosphate, chlorosilicate, vanadium phosphate, and zinc oxide system. The fluorescent powder can be a mixture of at least two different species of each type of the just-listed compounds.

In some embodiments, the adhesive layer also includes diffusion micro-particles which are dispersed in the adhesive layer. In some examples, the diffusion micro-particles are uniformly dispersed in the adhesive layer.

In some embodiments of the fluorescent films of this invention, the adhesive layer is 100 weight parts, and/or the fluorescent powder is 1-250 weight parts.

In the fluorescent films of this invention, the color location is controlled by changing the quantity of the fluorescent powder added to or contained therein, or by adjusting the quantity or relative ratio of different fluorescent powders in a mixture of these different fluorescent powders.

Also in the fluorescent films of this invention, the color gamut can be controlled by changing the kind of the fluorescent powder or by mixing different types of fluorescent power (e.g., by changing their ratio). The NTSC (National Television System Committee) color gamut of the fluorescent films of this invention is equal to or over 70%, and can get as high as 110%.

In some other embodiments of this invention, the adhesive layer further includes diffusion micro-particles, which can be uniformly dispersed in the adhesive layer. The diffusion micro-particles can be selected from the group consisting of silicon dioxide, titanium dioxide, aluminum oxide, barium sulfate, barium titanate, glass micro-particles (i.e., reflective powder), calcium carbonate, polymethyl methacrylate (PMMA), polystyrene (PS), acrylonitrile-butadiene-styrene copolymer (ABS), polyurethane (PU), and organic polysilane. The particle size of the diffusion micro-particles can be in the range of 0.2-50 μm.

In some other embodiments of this invention, the adhesive layer in the fluorescent films is 100 weight parts, and/or the diffusion micro-particles are in the range of 0-250 weight parts.

In still some other embodiments of this invention, the fluorescent film according to this invention, wherein the adhesive is 100 weight parts, the fluorescent powder is 20-100 weight parts, the diffusion micro-particles is 5-50 weight parts.

In some other embodiments of this invention, the fluorescent powder is preferably selected from the group consisting of aluminate, silicate, nitride, and nitrogen oxide. The diffusion micro-particles are preferably selected from the group consisting of silicon dioxide, titanium dioxide, barium sulfate and PMMA. The particle size of the diffusion micro-particles is preferably in the range of 0.3-30 μm.

In some other embodiments of this invention, the particle size of the fluorescent powder is in the range of 0.2-50 μm.

In some embodiments of the fluorescent films of this invention, the adhesive layer is 100 weight parts, the fluorescent powder is 20-50 weight parts, and the diffusion micro-particles are 5-25 weight parts. In some other embodiments, the fluorescent powder is aluminate or nitride, and the particle size of the fluorescent powder is in the range of 5-25 μm. In still some other embodiments, the diffusion micro-particles are titanium dioxide or barium sulfate, and the particle size of the diffusion micro-particles is in the range of 10-30 µm.

In some embodiments, the thickness of the adhesive layer is in the range of 10-35 µm. In some other embodiments, the transparent base layer is made of PET and has a thickness of about 100 µm.

In some embodiments, the fluorescent powder includes red-emitting fluorescent powder (including nitride as the material) and green-emitting fluorescent powder (including aluminate as the material).

In order to further improve the optical function and to reduce the number of the films used in or required by a backlight module or display, the fluorescent films of the present invention may also include a protective coating or a prism layer. Specifically, the additional protective coating or prism layer may be is arranged on the surface of the transparent base layer (opposite to the surface with the adhesive layer).

In some embodiments, the additional protective coating has irregular bulge. Or, the additional protective coating has a thickness of 2-15 µm.

In some embodiments, the additional prism layer is composed of prism bar or microlens. The cross-section (seeing beside the film) of the prism bar can be triangle, and the vertex angle can be in the range of 50°-130°. The top of the vertex angle of the prism bar can be a sharp corner or a circular arc shape (i.e., the R angle), whereas the height of the prism bar can be in the range of 10-200 µm. The signal structure of the microlens, when seen from above the film, can be circular, ellipse or polygon; the signal structure of the microlens, when seen beside the film, can be in an arc shape. The diameter of the signal structure of the microlens can be in the range of 100-1000 µm, and the distance between two neighboring signal structures can be in the range of 100-1000 µm.

In some embodiments, in order to extend the working life of the fluorescent films of this invention, a protective layer is arranged on the adhesive layer and function as a barrier. The protecting layer can be a solid material and selected from the group consisting of inorganic oxides, organic polymers, and mixtures thereof.

The present invention also provides uses of the above-described fluorescent films. These fluorescent films can be applied to backlight sources, display devices, lighting devices or protective films—all of which can be included in the above-described fluorescent films.

Accordingly, the present invention further provides a backlight source which includes a light-emitting source, a light-guiding plate, a reflective plate, and an above-described fluorescent film. In the backlight source, the light-guiding plate can lie under the fluorescent film, the reflective plate can lie under the light-guiding plate, the light-emitting source can lie under or on the side of the light-guiding plate.

The present invention also provide display devices each of which includes a back plate, a light-emitting source, a reflective plate, a light-guiding plate, an above-described fluorescent film, a prism plate, and a liquid crystal display module.

The present invention also provides lighting devices each of which includes a light-emitting source, a light-guiding plate, and an above-described fluorescent film. The light from the light-emitting source goes through a light-guiding plate and then activates the fluorescent powder in the fluorescent film and cause them to emit light directly. The light emitted from the fluorescent powder mixes with the light from the light-emitting source, resulting in the lighting device meeting the special requirement.

In some embodiments, the protective film is a fluorescent film provided by this invention. The fluorescent powder in the adhesive layer of the fluorescent film may absorb light with a short wavelength (for example, blue light, UV light, and X-ray) and change them into light with a long wavelength or into heat partly. This reduces the contents of the harmful light with a short wavelength after they go through the fluorescent film, and therefore reduce the harm to people.

In some embodiments, the light-emitting source is selected from the group consisting of electroluminescence light (EL), cold cathode fluorescent lamp (CCFL), and Light Emitting Diode (LED). The light from the light-emitting source should be able to activate the fluorescent powder to emit light.

Compared with the prior art, the fluorescent films of the present invention have an adjustable color location and allow controlled adjustments of their color location and their color gamut. The NTSC color gamut of the fluorescent films are at least 70% and can get as high as 110%, reaching the same level of OLED or quantum-dot films. Because the fluorescent powder itself is stable, the fluorescent film having slow luminous decay, and may be used for a very long time in optical display modules. The fluorescent films can be produced in a simply process and at a low cost, with a surprisingly high yield. Further, as expanded development of the optical function, the fluorescent films can include a protective coating or prism layer on the other surface of the transparent base layer, which may further reduce the number of the plates used in the backlight module, thereby further reducing the cost. The fluorescent films of this invention have a wide range of commercial applications as they can be used not only in the backlight module of a display device, but also in the illumination field. Additionally, the fluorescent films of this invention may absorb the harmful light with a short wavelength, work as protective film to reduce the harm to the body. For example, the fluorescent film is worked as plate preventing blue light.

DETAILED DESCRIPTION OF THE INVENTION

The following description describes the technical features of the fluorescent films provided in this invention, as well as their main functional characters and advantages, by providing examples of the present invention and comparing them with comparative examples.

Figure 1:
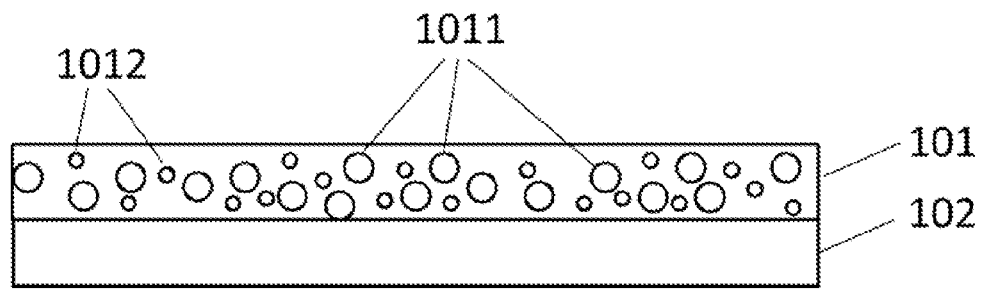
FIG. 1 is the schematic drawing of section of the fluorescent film of example 1.
Figure 2:
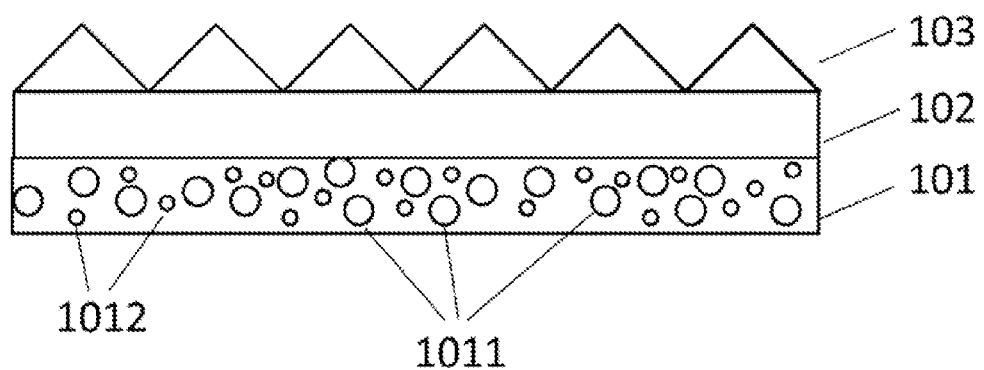
FIG. 2 is the schematic drawing of section of the fluorescent film of example 7.
Figure 3:
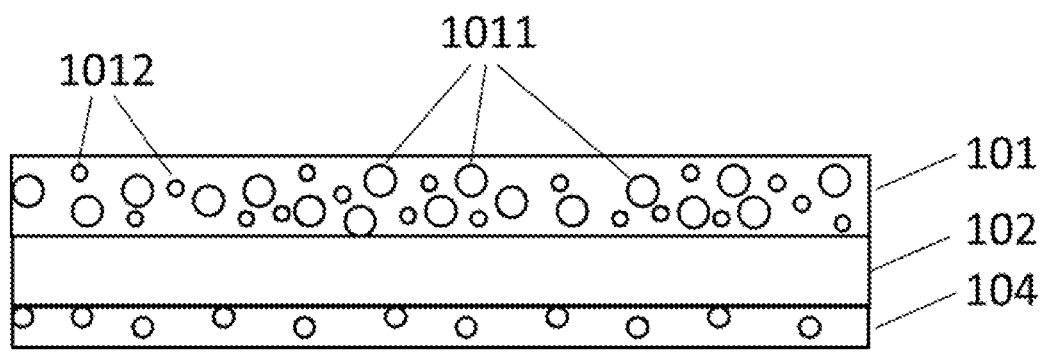
FIG. 3 is the schematic drawing of section of the fluorescent film of example 8.
Figure 4:
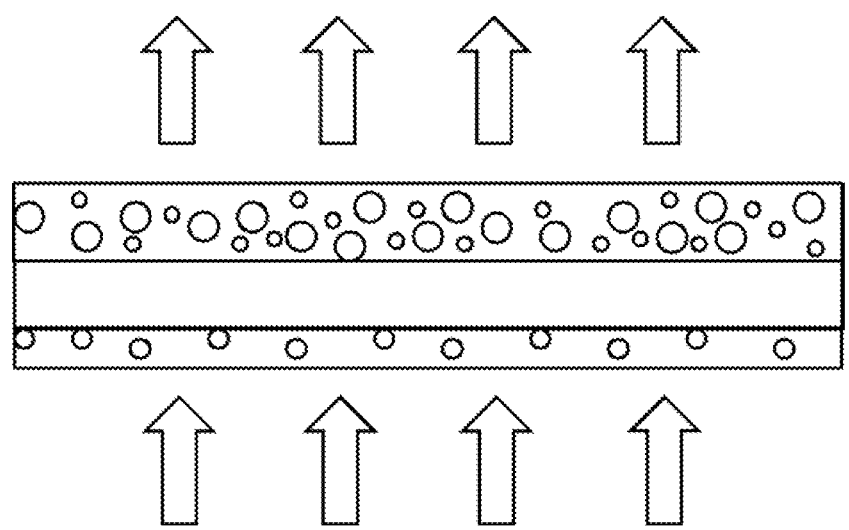
FIG. 4 is the schematic drawing of light going through the fluorescent film shown in FIG. 3.

As shown in FIG. 1, the present invention provides fluorescent films each having an adjustable color location and a color gamut, wherein each fluorescent film comprises a transparent base layer 102 and an adhesive layer 101; the adhesive layer 101 is bound to a surface of the transparent base layer 102; the adhesive layer 101 comprises fluorescent powder 1011 and diffusion micro-particles 1012, the fluorescent powder 1011 and the diffusion micro-particles 1012 are uniformly dispersed in the adhesive. Further, as the development of the optical function, the fluorescent films also may include a protective coating 104 (as shown in FIG. 3) or prism layer 103 (as shown in FIG. 2) on the other surface (i.e., the surface without adhesive layer) of the transparent base layer.

The following methods are used to test the color location and the color gamut of a fluorescent film of this invention: First, obtaining a fluorescent film of this invention of the A4 size, and then placing the film at the center of a backlight module (blue light LED light source) of 42 inches, and finally lighting it with a voltage of 24 V. The color location test is carried out by instrument BH-7 luminancemeter produced by Suzhou Fstar Scientific Instrument Co., Ltd. (Suzhou, China). After continuing to cover the combination of prism plate and DBEF and liquid crystal display module on the fluorescent film, the color gamut test is carried out by the same instrument mentioned above.

The luminance test of the backlight module is also carried out by the same instrument mentioned above.

EXAMPLE 1

A fluorescent film of the present invention was prepared and having an adjustable color location and a color gamut. In this fluorescent film, the adhesive layer comprised yellow-light-emitting fluorescent powder (comprising aluminate) of 15 weight parts, diffusion micro-particles of 5 weight parts, and an epoxy resin adhesive of 100 weight parts. The diffusion micro-particles were titanium dioxide with a particle size of 300-500 nm. The transparent base layer was polyethylene terephthalate (PET) with a thickness of 100 μm. The fluorescent powder and the diffusion micro-particles were first uniformly dispersed in the adhesive, and the mixed adhesive was coated onto the transparent base layer of PET before the adhesive layer was cured. The thickness of the cured adhesive layer was in the range of 13-15 μm.

EXAMPLE 2

Another fluorescent film of the present invention was prepared and having an adjustable color location and a color gamut. In this fluorescent film, the adhesive layer comprised yellow-light-emitting fluorescent powder (the material was aluminate) of 1 weight parts, diffusion micro-particles of 250 weight parts, and a polyurethane resin adhesive of 100 weight parts. The diffusion micro-particles were silicon dioxide with a particle size of 0.2-0.5 μm. The transparent base layer was polyethylene terephthalate (PET) with a thickness of 25 μm. The fluorescent powder and the diffusion micro-particles were uniformly dispersed in a polyurethane resin adhesive and the the mixed adhesive was coated onto the transparent base layer of PET before the adhesive layer was cured. The thickness of the cured adhesive layer was in the range of 5-7 μm.

EXAMPLE 3

Still another fluorescent film of the present invention was prepared and having an adjustable color location and a color gamut. In this fluorescent film, the adhesive layer comprised green-emitting fluorescent powder (the material was silicate) of 100 weight parts, red-light-emitting fluorescent powder (the material was nitride) of 25 weight parts, diffusion micro-particles of 25 weight parts, and an epoxy resin adhesive of 100 weight parts. The diffusion micro-particles were polymethyl methacrylate with a particle size of 20-25 μm. The transparent base layer is polyethylene terephthalate (PET) with a thickness of 250 μm. The fluorescent powder and the diffusion micro-particles were uniformly dispersed in the epoxy resin adhesive and the mixed adhesive was coated on the transparent base layer before the adhesive layer was cured. The thickness of the cured adhesive layer was about 30 μm.

EXAMPLE 4

Still another fluorescent film of the present invention was prepared and having an adjustable color location and a color gamut. In this fluorescent film, the adhesive layer comprised yellow-emitting fluorescent powder (the material is aluminate) of 200 weight parts, red-light-emitting fluorescent powder (the material is nitride) of 50 weight parts, and a silicone resin adhesive of 100 weight parts. The cured silicone resin adhesive layer containing fluorescent powder had a thickness of 15-17 μm. The transparent base layer was a polycarbonate (PC) film with a thickness of 25 μm. Diffusion micro-particles were not added to the fluorescent film of this example, as this fluorescent powder itself may be used as diffusion micro-particles for diffusing the light and extending the light path.

EXAMPLE 5

Still another fluorescent film of the present invention was prepared and having an adjustable color location and a color gamut. In this fluorescent film, the adhesive layer comprised a yellow-emitting fluorescent powder (the material is silicate) of 5 weight parts, a red-light-emitting fluorescent powder (the material is nitride) of 25 weight parts, a green-emitting fluorescent powder (the material is aluminate) of 100 weight parts, diffusion micro-particles of 125 weight parts, and an acrylic modified polyurethane resin adhesive of 100 weight parts. The diffusion micro-particles comprised polymethyl methacrylate and had a particle size of 45-50 μm. The cured adhesive layer containing the fluorescent powder and diffusion micro-particles had a thickness of 75 μm. The transparent base layer was a polyethylene (PE) plate with a thickness of 100 μm.

EXAMPLE 6

Still another fluorescent film of the present invention was prepared and having an adjustable color location and a color gamut. In this fluorescent film, the adhesive layer comprised a yellow-light-emitting fluorescent powder (the material was silicate) of 50 weight parts, a red-emitting fluorescent powder (the material is nitride) of 100 weight parts, a green-emitting fluorescent powder (the material is nitride) of 100 weight parts, diffusion micro-particles of 100 weight parts, and an acrylic resin adhesive of 100 weight parts. The diffusion micro-particles comprised barium sulfate and had a particle size of 400-600 nm. The cured adhesive layer containing the fluorescent powder and diffusion micro-particles had a thickness of 25-30 μm. The transparent base layer was a polyamide (PA) plate with a thickness of 100 μm.

EXAMPLE 7

The adhesive layer in this example was the same as that in the fluorescent film of Example 1. The adhesive layer containing the fluorescent powder was cured and then coated with a prism structure on the other side of the transparent base layer. The vertex angle of the prism bar was 50°, while the height of the prism bar was 100 µm.

EXAMPLE 8

The adhesive layer in this example was the same as that in the fluorescent film of Example 1. The adhesive layer containing fluorescent powder was cured and then coated with a protective coating on the other side of the transparent base layer. The thickness of the protective coating was 6-7 µm.

EXAMPLE 9

Still another fluorescent film of the present invention was prepared and having an adjustable color location and a color gamut. In this fluorescent film, the adhesive of acrylic resin was 100 weight parts, the fluorescent powder was 20 weight parts, the diffusion micro-particles were 5 weight parts. The fluorescent powder comprised a red-emitting fluorescent powder (the material was nitride) of 10 weight parts, a green-emitting fluorescent powder (the material was silicate) of 10 weight parts, the particle size of the fluorescent powder was 0.2-4 µm. The diffusion micro-particles were of silicon dioxide and had a particle size of 0.3-10 µm. The adhesive layer had a thickness of 5 µm, and the transparent base layer was a PET plate with a thickness of 100 µm.

EXAMPLE 10

Still another fluorescent film of the present invention was prepared and having an adjustable color location and a color gamut. In this fluorescent film, the acrylic resin adhesive was 100 weight parts, the fluorescent powder was 100 weight parts, the diffusion micro-particles were 50 weight parts. The fluorescent powder comprised a red-emitting fluorescent powder (the material was nitrogen oxide) of 50 weight parts, a green-emitting fluorescent powder (the material was aluminate) of 50 weight parts, and the particle size of the fluorescent powder was 40-50 µm. The diffusion micro-particles were of titanium dioxide and had a particle size of 20-30 µm. The thickness of the adhesive layer was 75 µm and the transparent base layer was a PET plate with a thickness of 100 µm.

EXAMPLE 11

Still another fluorescent film of the present invention was prepared and having an adjustable color location and a color gamut. In this fluorescent film, the adhesive of epoxy resin was 100 weight parts, the fluorescent powder was 60 weight parts, and the diffusion micro-particles were 30 weight parts. The fluorescent powder comprised a red-emitting fluorescent powder (the material was silicate) of 30 weight parts, a green-emitting fluorescent powder (the material was aluminate) of 30 weight parts, the particle size of the fluorescent powder was 30-50 µm. The diffusion micro-particles were of barium sulfate and had a particle size of 10-20 µm. The thickness of the adhesive layer was 55 µm, and the transparent base layer was a PET plate with a thickness of 100 µm.

EXAMPLE 12

Still another fluorescent film of the present invention was prepared and having an adjustable color location and a color gamut. In this fluorescent film, the adhesive of polyurethane resin was 100 weight parts, the fluorescent powder was 80 weight parts, and the diffusion micro-particles were 15 weight parts. The fluorescent powder comprised a red-emitting fluorescent powder (the material was nitride) of 40 weight parts, a green-emitting fluorescent powder (the material was aluminate) of 40 weight parts, and the particle size of the fluorescent powder was 0.2-20 µm. The diffusion micro-particles were of PMMA and had a particle size of 0.3-5 µm. The thickness of the adhesive layer was 35 µm and the transparent base layer was a PET plate with a thickness of 100 µm.

EXAMPLE 13

Still another fluorescent film of the present invention was prepared and having an adjustable color location and a color gamut. In this fluorescent film, the adhesive of acrylic resin was 100 weight parts, the fluorescent powder was 20 weight parts, and the diffusion micro-particles were 25 weight parts. The fluorescent powder comprised a red-emitting fluorescent powder (the material was nitride) of 10 weight parts, a green-emitting fluorescent powder (the material was aluminate) of 10 weight parts, the particle size of the fluorescent powder was 5-25 µm. The diffusion micro-particles were of barium sulfate and had a particle size of 10-30 µm. The thickness of the adhesive layer was 30 µm. The transparent base layer was PET plate with a thickness of 100 µm.

EXAMPLE 14

Still another fluorescent film of the present invention was prepared and having an adjustable color location and a color gamut. In this fluorescent film, the adhesive of polyurethane resin was 100 weight parts, the fluorescent powder was 50 weight parts, and the diffusion micro-particles were 5 weight parts. The fluorescent powder comprised a red-emitting fluorescent powder (the material was nitride) of 20 weight parts, a green-emitting fluorescent powder (the material was aluminate) of 30 weight parts, and the particle size of the fluorescent powder was 5-25 µm. The diffusion micro-particles were of titanium dioxide and had a particle size of 10-30 µm. The thickness of the adhesive layer was 10 µm. The transparent base layer was a PET plate with a thickness of 100 µm.

EXAMPLE 15

Still another fluorescent film of the present invention was prepared and having an adjustable color location and a color gamut. In this fluorescent film, the adhesive of epoxy resin was 100 weight parts, the fluorescent powder was 35 weight parts, and the diffusion micro-particles were 15 weight parts. The fluorescent powder comprised a red-emitting fluorescent powder (the material was nitride) of 15 weight parts, a green-emitting fluorescent powder (the material was aluminate) of 20 weight parts, and the particle size of the fluorescent powder was 5-25 µm. The diffusion micro-particles were of barium sulfate and had a particle size of 10-30 µm. The thickness of the adhesive layer was 35 µm. The transparent base layer was a PET plate with a thickness of 100 µm.

COMPARATIVE EXAMPLE 1

This comparative example was the same as the fluorescent film of Example 1, except that the diffusion micro-particles of titanium dioxide were not added into the adhesive layer.

COMPARATIVE EXAMPLE 2

This comparative example was the same as the fluorescent film of Example 1, except that the weight parts of the fluorescent powder was two times of that in Example 1.

TABLE 1

Performance test table of the fluorescent film provided by the examples and the comparative examples of the present invention

| No. | Color location (X, Y) | NTSC color gamut | luminance (cd/m²) |
|---|---|---|---|
| Example 1 | (0.241, 0.215) | 72.3% | 3268 |
| Example 2 | (0.176, 0.0.073) | 72.6% | 2172 |
| Example 3 | (0.235, 0.154) | 102.5% | 1657 |
| Example 4 | (0.312, 0.347) | 85.6% | 3874 |
| Example 5 | (0.327, 0.319) | 93.4% | 2906 |
| Example 6 | (0.356, 0.341) | 88.2% | 4162 |
| Example 7 | (0.243, 0.217) | 72.8% | 4059 |
| Example 8 | (0.239, 0.220) | 72.8% | 3291 |
| Example 9 | (0.316, 0.321) | 90.2% | 3562 |
| Example 10 | (0.306, 0.317) | 91.0% | 3609 |
| Example 11 | (0.339, 0.320) | 90.8% | 3791 |
| Example 12 | (0.306, 0.301) | 91.2% | 3602 |
| Example 13 | (0.316, 0.317) | 95.0% | 4009 |
| Example 14 | (0.309, 0.310) | 98.8% | 4121 |
| Example 15 | (0.316, 0.301) | 110% | 4012 |
| Comparative Example 1 | (0.208, 0.128) | 71.9% | 2880 |
| Comparative Example 2 | (0.283, 0.262) | 72.6% | 4330 |

According to the performance test results of the fluorescent films as shown Table 1, it can be concluded that the fluorescent films provided by the present invention had an adjustable color location and a color gamut, and could meet the different requirements of different clients. The data of example 1 and comparative example 1 show that the diffusion micro-particles added in the adhesive layer extended the light path of incoming light, increased the utility efficiency of the light-emitting used by the fluorescent powder, thus finally increased the luminance of the fluorescent film. The data of example 1 and comparative example 2 show that the fluorescent films of the present invention can adjust and control the color location and color gamut only by changing the weight parts of the fluorescent powder (even the same kind of fluorescent powder). On the other hand, the data of example 1 and example 7 show that the prism structure could further increase the luminance. The data of example 1 and example 8 show that the protective coating will not influence the color gamut, and only have a small influence in the color location and luminance. More importantly, the data from Examples 1 to 6 shown that the fluorescent films of the present invention resulted in different NTSC color gamut by mixing different kinds of fluorescent powder or different types of the same fluorescent powder system. The fluorescent films of this invention have wide market perspective. The fluorescent films provided by any one of Example 9-15 had a high color gamut and luminance. Especially, the fluorescent films of Example 13-15 resulted in an even higher color gamut and luminance.

The above description describes only some preferred embodiments of the present invention and is not intended to limit the scope of the present invention as defined in the attached claims. All equivalent alterations and modifications made according to the present invention will fall within the scope of the claims of the present invention.

What is claimed is:

1. A fluorescent film having a desired color location and a color gamut, the fluorescent film comprises:
    a transparent base layer; and
    an adhesive layer bound to a surface of the transparent base layer, wherein the adhesive layer comprises an adhesive and a fluorescent powder dispersed in the adhesive.

2. The fluorescent film of claim 1, wherein the adhesive is 100 weight parts, and the fluorescent powder is 1-250 weight parts.

3. The fluorescent film of claim 1, wherein the fluorescent film further comprises a protective coating or prism layer, the adhesive layer is bond to one surface of the transparent base layer, and the protective coating or prism layer is arranged on the other surface of the transparent base layer.

4. The fluorescent film of claim 1, wherein a protecting layer is arranged on the adhesive layer.

5. The fluorescent film of claim 1 in combination with at least one of a backlight source, a display device, a lighting device or a protective film.

6. A backlight source comprising a light-emitting source, a light-guiding plate, a reflective plate, and a fluorescent film of claim 1; wherein the light-guiding plate lies under the fluorescent film, the reflective plate lies under the light-guiding plate, and the light-emitting source lies under or on the side of the light-guiding plate.

7. The backlight source of claim 6, wherein the light-emitting source is selected from the group consisting of electroluminescence light (EL), cold cathode fluorescence lamp (CCFL), and Light Emitting Diode (LED).

8. The fluorescent film of claim 1, wherein the adhesive layer further comprises diffusion micro-particles, and the diffusion micro-particles are dispersed in the adhesive, the adhesive is 100 weight parts, and the diffusion micro-particles are 0-250 weight parts.

9. The fluorescent film of claim 8, wherein the adhesive is 100 weight parts and the fluorescent powder is 1-250 weight parts.

10. The fluorescent film of claim 8, wherein the adhesive is 100 weight parts, the fluorescent powder is 20-100 weight parts, and the diffusion micro-particles are 5-50 weight parts.

* * * * *